(12) United States Patent
Bugatti

(10) Patent No.: US 10,136,751 B2
(45) Date of Patent: Nov. 27, 2018

(54) ELECTRIC KETTLE

(71) Applicant: LA SAN MARCO DI FRANCESCO BUGATTI & C.-S.A.P.A., Lumezzane (IT)

(72) Inventor: Clemente Bugatti, Lumezzane (IT)

(73) Assignee: LA SAN MARCO DI FRANCESCO BUGATTI & C.—S.A.P.A., Lumezzane (IT)

( * ) Notice: Subject to any disclaimer, the term of this patent is extended or adjusted under 35 U.S.C. 154(b) by 66 days.

(21) Appl. No.: 15/184,899

(22) Filed: Jun. 16, 2016

(65) Prior Publication Data

US 2016/0374500 A1 Dec. 29, 2016

(30) Foreign Application Priority Data

Jun. 25, 2015 (IT) .................. 102015000027411

(51) Int. Cl.
*A47J 27/21* (2006.01)
*A47J 27/212* (2006.01)

(52) U.S. Cl.
CPC ....... *A47J 27/21083* (2013.01); *A47J 27/212* (2013.01); *A47J 27/2105* (2013.01); *A47J 27/21141* (2013.01); *A47J 27/21041* (2013.01); *A47J 2202/00* (2013.01); *A47J 2203/00* (2013.01)

(58) Field of Classification Search
CPC ............ A47J 27/21083; A47J 27/21041; A47J 27/2105; A47J 27/212; A47J 27/21141; A47J 2202/00; A47J 2203/00
See application file for complete search history.

(56) References Cited

U.S. PATENT DOCUMENTS 8,739,687 B1 * 6/2014 Tacklind ................. A47J 31/42
99/280
2006/0086256 A1 4/2006 Heinze

FOREIGN PATENT DOCUMENTS

GB 2328143 A 2/1999
GB 2430138 A 3/2007
WO WO 2008/155538 A2 12/2008

OTHER PUBLICATIONS

European Search Report dated Feb. 23, 2016 citing references for App. No. UB20151629.

* cited by examiner

*Primary Examiner* — Shawntina Fuqua
(74) *Attorney, Agent, or Firm* — Koppel, Patrick, Heybl & Philpott

(57) ABSTRACT

An electric kettle comprising a container body comprising electric heating elements adapted to heat water contained in the container body, and comprising a base, configured to support the container body and to supply electric power at least to such electric heating elements when the container body is supported by the base; the container body comprises a longitudinal extension axis and is able to rotate, about the longitudinal extension axis, with respect to the base; the electric kettle further comprises means for detecting the angular movement of the container body with respect to the base, where the extent of the angular movement detected by the means for detecting angular movement determines the degree of activation of the electric heating elements necessary in order to bring the water to a desired temperature.

11 Claims, 4 Drawing Sheets

ELECTRIC KETTLE

The present invention relates to an electric kettle.

The most common electric kettles are constituted by a container body, which is adapted to be conveniently filled with water, and which comprises, usually in the bottom, an electric element adapted to heat the water until it reaches boiling point. The power supply to the electric element is usually cut, automatically, when the boiling point of the water is reached.

Electric kettles also exist which make it possible to set the temperature to which it is desired to heat the water.

Such conventional electric kettles are not however devoid of drawbacks, among which is the fact that their use is not simple and intuitive.

Such electric kettles in fact often have a plurality of buttons that must be conveniently pressed in order to set the desired temperature to which to heat the water.

The aim of the present invention consists in providing an electric kettle that overcomes the limitations of the known art by being simple and straightforward to use.

Within this aim, an object of the present invention is to provide an electric kettle that makes it possible to set the desired temperature to which to heat the water in an intuitive and natural manner.

Another object of the invention consists in providing an electric kettle that is capable of offering the widest guarantees of reliability and safety in use.

Another object of the invention consists in providing an electric kettle that makes it possible to accurately and precisely control the heating of the water.

This aim and these and other objects which will become better apparent hereinafter are achieved by an electric kettle comprising a container body comprising electric heating means adapted to heat water contained in said container body, and comprising a base, configured to support said container body and to supply electric power at least to said electric heating means when said container body is supported by said base, said container body comprising a longitudinal extension axis and being able to rotate about said longitudinal extension axis, with respect to said base, characterized in that it comprises means for detecting the angular movement of said container body with respect to said base, the extent of said angular movement detected by said means for detecting the angular movement determining the degree of activation of said electric heating means necessary in order to bring said water to a desired temperature.

Further characteristics and advantages of the invention will become better apparent from the description of a preferred, but not exclusive, embodiment of an electric kettle, which is illustrated by way of non-limiting example with the aid of the accompanying drawings wherein.

Figure 1:
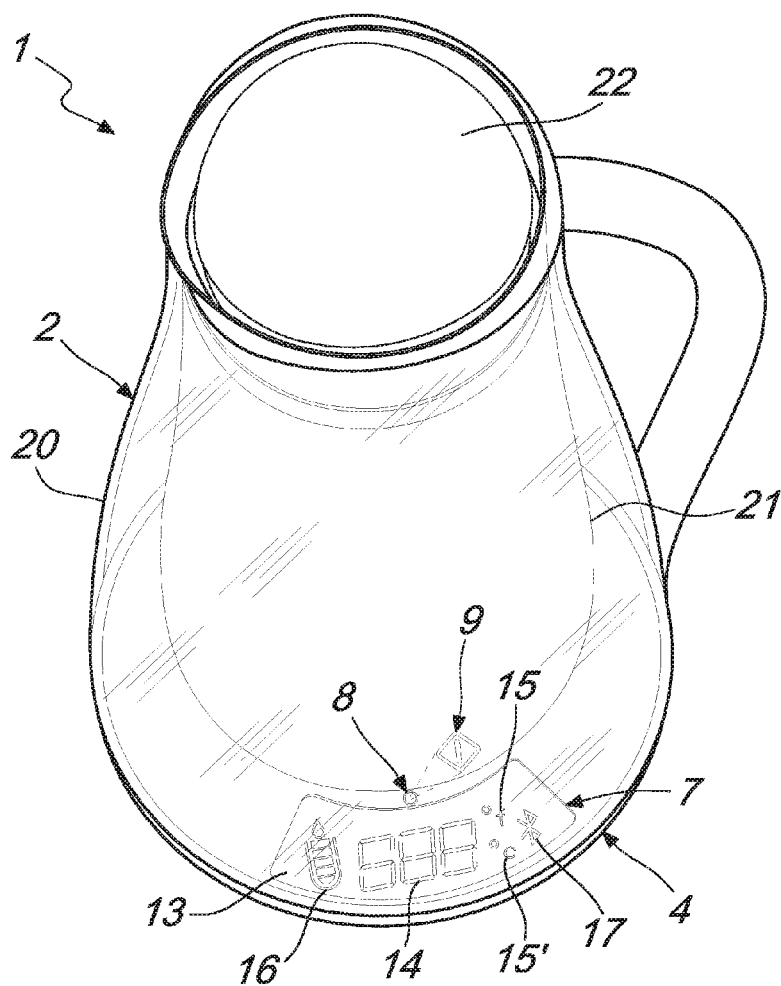
FIG. 1 is a perspective view of an embodiment of an electric kettle, according to the invention.
Figure 2:
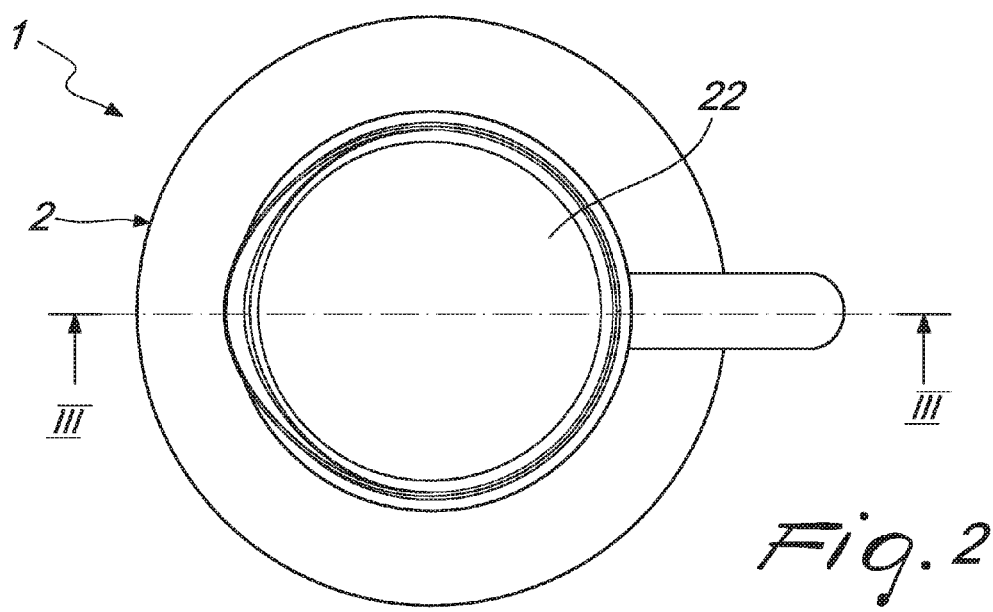
FIG. 2 is a plan view from above of the electric kettle of FIG. 1, according to the invention.
Figures 3, 3A:
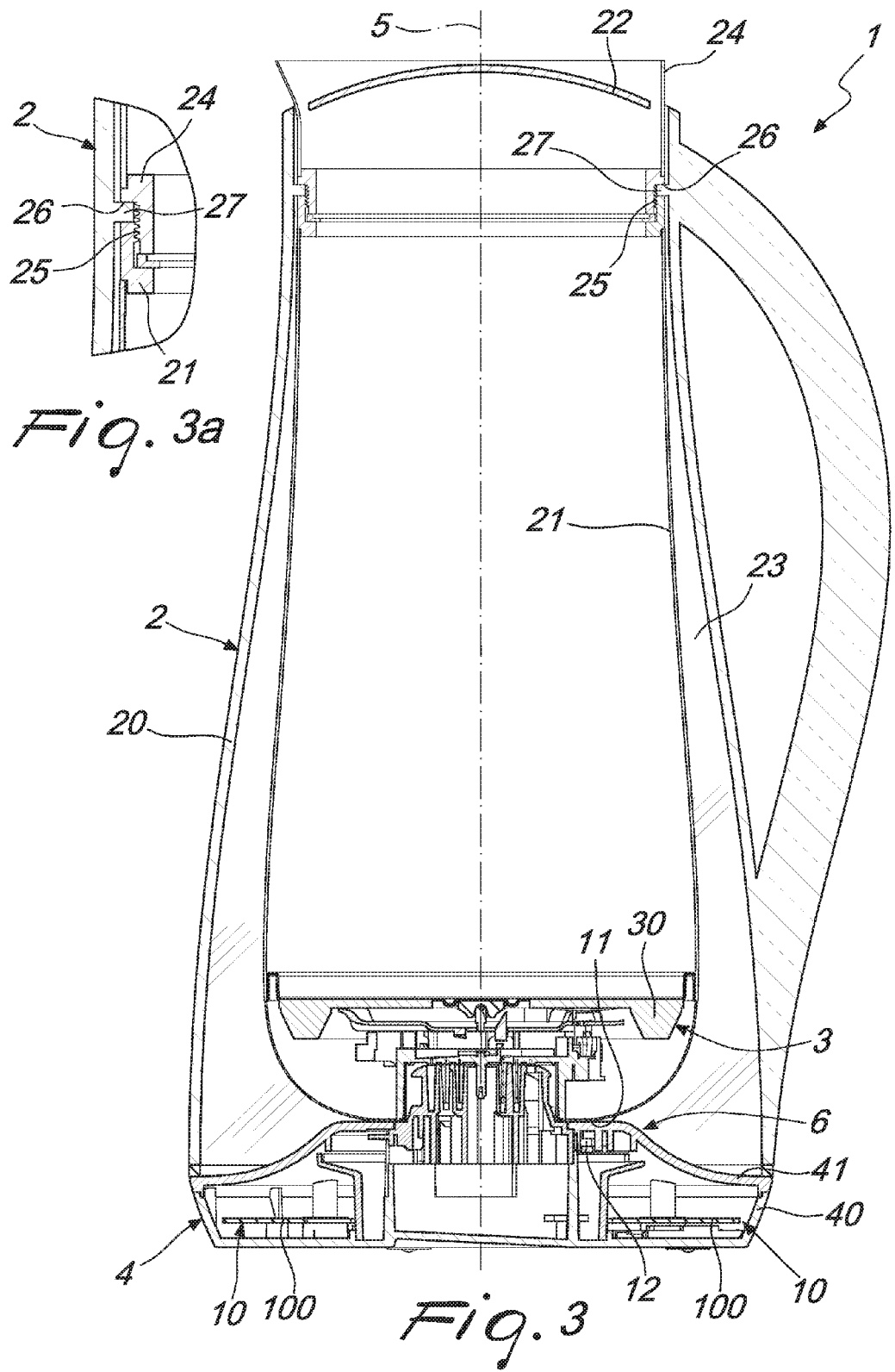
FIG. 3 is a cross-sectional view of the electric kettle shown in FIG. 2, taken along the line III-III.
FIG. 3a is an enlarged portion of the cross-section of the electric kettle shown in FIG. 3.
Figure 4:
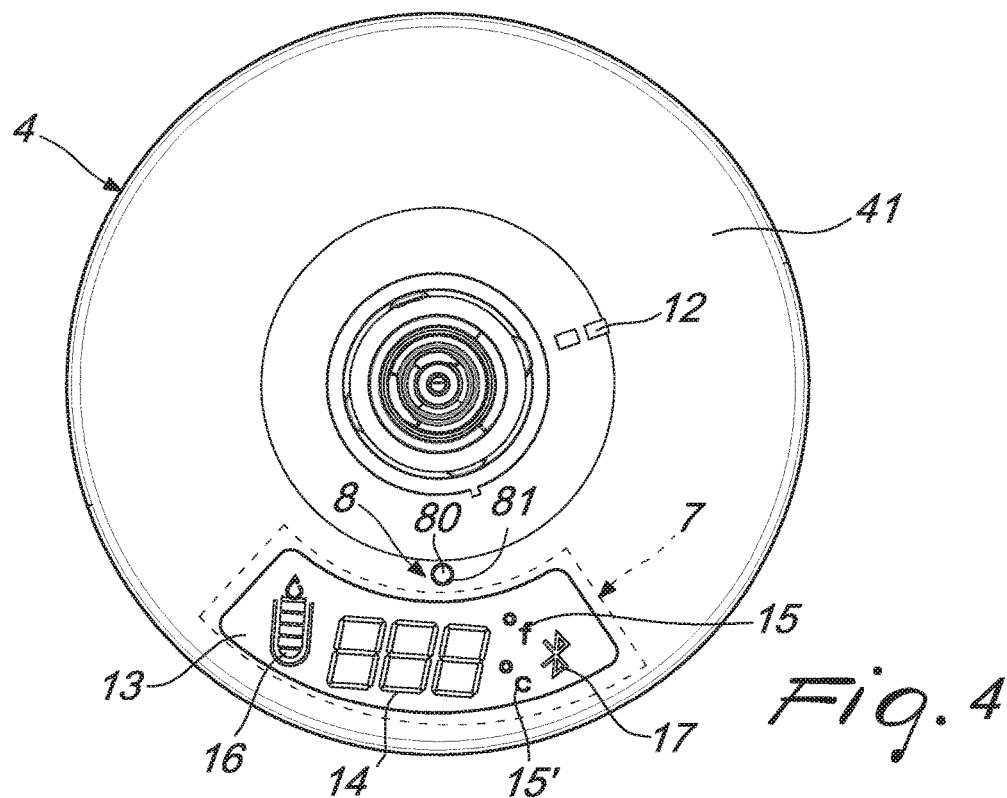
FIG. 4 is a plan view from above of the base of the electric kettle of FIG. 1, according to the invention.
Figure 5:
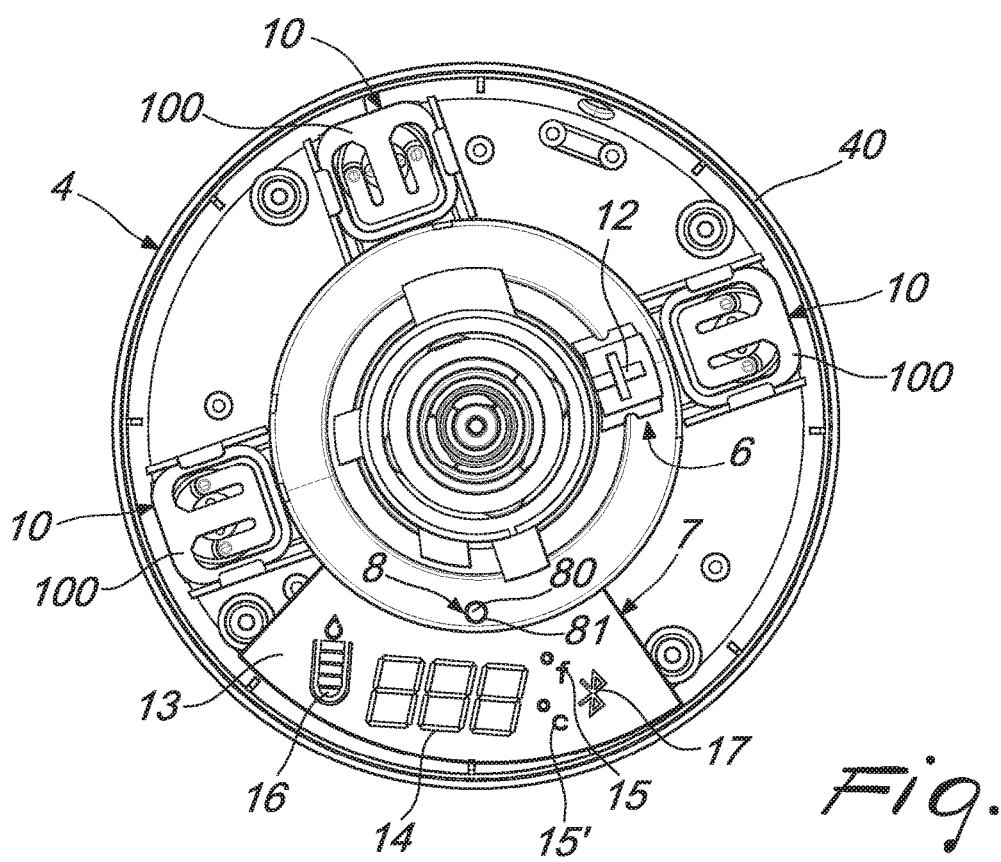
FIG. 5 is a plan view from above of the base of the electric kettle of FIG. 1, according to the invention, with the top cover removed.

With reference to the figures, the electric kettle, generally designated by the reference numeral 1, comprises a container body 2 comprising electric heating means 3 adapted to heat water contained in the container body 2, and a base 4, configured to support the container body 2 and to supply electric power at least to the electric heating means 3 when the container body 2 is supported by the base 4. The container body 2 has a longitudinal extension axis 5 and is able to rotate, about such longitudinal extension axis 5, with respect to the base 4.

According to the invention, the electric kettle 1 comprises means 6 for detecting the angular movement of the container body 2 with respect to the base 4, where the extent of the angular movement detected by the detection means 6 determines the degree of activation of the electric heating means 3 necessary in order to bring the water contained in the container body 2 to a desired temperature.

The detection means 6 can therefore detect variations of the angular position of the container body 2 with respect to the base 4 and associate such variations with a corresponding variation of the desired heating temperature of the water, possibly by way of a conveniently programmed electronic board.

The container body 2 can comprise an external supporting structure 20, preferably made of a substantially transparent material, adapted to support a container element 21 configured to receive the water to be heated, and provided with a closure plug 22.

The electric heating means 3 can comprise an electric heating element 30 which receives electric power from the base 4 when the container body 2 is arranged thereon. The electric heating element 30 is advantageously arranged at the bottom of the container element 21.

Advantageously, the container element 21 is associated with the external supporting structure 20 so that the walls of the container element 21 are substantially separated from the walls of the external supporting structure 20. Advantageously, in fact, between the walls of the container element 21 and the external supporting structure 20 there is an air interspace 23 adapted to prevent the transmission of heat from the container element 21 to the external supporting structure 20.

Advantageously, the container body 2 also comprises a fixing element 24, which can be fixed to the container element 21 at the upper part of the container element 21, preferably by way of a threading 25. in the fixing configuration, between the container element 21 and the fixing element 24 an annular recess 26 is advantageously provided and is configured to engage with an annular collar 27 which is provided circumferentially internally to the external supporting structure 20.

Advantageously in fact it is the screwing of the fixing element 24 to the container element 21 that enables the fixing thereof, in suspension, to the external supporting structure 20, about the annular collar 27.

In this manner the components of the container body 2, specifically the external supporting structure 20, the container element 21 and the fixing element 24, can all be dismantled and assembled by the user in order to allow the cleaning thereof.

The electric kettle 1 advantageously comprises at least one proximity sensor 7 adapted to determine the activation or shutdown of the electric heating means 3.

The proximity sensor 7 is advantageously adapted to detect the presence of a hand or of a finger of the user.

The electric kettle 1 advantageously comprises light projection means 8 configured to generate a light signal 9 proximate to the proximity sensor 7 and visible on the external surface of the electric kettle 1. In particular, the light projection means 8 can comprise a luminous LED 80 and a lens 81 adapted to project the light of the LED 80 so as to generate, on the external supporting structure 20, the light signal 9.

Bringing the hand or a finger of the user close to such light signal 9 enables the detection thereof by the proximity sensor 7 and therefore the activation or the shutdown of the electric heating means 3.

The means 6 for detection of angular movement can comprise an encoder selected from the group consisting of: optical encoders, potentiometric encoders, capacitive encoders, inductive encoders and magnetic encoders.

The means 6 for detection of angular movement are advantageously configured to detect the direction of rotation of the container body 2 with respect to the base 4, where rotation in one direction determines an increase of the value of the desired temperature to which to heat the water, while rotation in an opposite direction determines a decrease of the value of the desired temperature to which to heat the water.

The means 6 for detection of angular movement are advantageously configured to detect also the speed of variation of the angular position of the container body 2 with respect to the base 4.

The means 6 for detection of angular movement can for example comprise an optical encoder which comprises a photodiode 12 associated with the base 4 and a reading code applied to the lower face 11 of the container body 2 which faces the base 4.

The means 6 for detection of angular movement advantageously make it possible to detect the variation of angular position of the container body 2 with respect to the base 4, and the speed of such angular variation, and also the direction of rotation of the container body 2 with respect to the base 4. In particular, with an optical encoder, the reading code presents a matrix that is such as to allow the detection of all three of the above mentioned items of information.

The electric kettle 1 advantageously comprises means of detecting the quantity of water 10 contained in the container body 2. As illustrated in the accompanying figures, the means for detection of the quantity of water 10 can comprise a plurality of weight sensors 100 distributed circumferentially in the base 4.

The electric kettle 1 advantageously comprises a wireless communication module, preferably Bluetooth, which is configured to remotely connect a mobile device and to remotely control the operation of the electric kettle 1. In this manner it is possible for example to activate the switching-on and the shutdown of the electric kettle 1 or to select the desired temperature to which to heat the water.

The electric kettle 1 advantageously comprises a display 13 adapted to display the actual temperature of the water, or the desired temperature of the water, and/or the quantity of water present in the container body 2 and/or the status of the wireless communication module.

The display 13 is advantageously provided with an indicator light 16 to indicate the level of water present in the container body 2.

The display 13 is further advantageously provided with a seven-segment display 14, which can indicate as needed the actual temperature of the water contained in the container body 2, or the desired temperature to which it is desired to heat the water. Beside the seven-segment display 14 there is advantageously a pair of indicator lights 15, 15' for indicating whether the temperature is displayed in degrees Fahrenheit 15 or in degrees Celsius 15'.

The display 13 can also have an indicator light 17 for indicating the activation status of the wireless communication module. The proximity sensor 7 can be advantageously associated with the perimeter of the display 13. In particular, the base 4 can comprise a lower portion of the base 40 and a closing cover 41. The proximity sensor 7 can be arranged at the portion of the perimeter of the display 13 which remains covered by the closing cover 41 of the base 4 when this is applied to the base.

Figure 6:
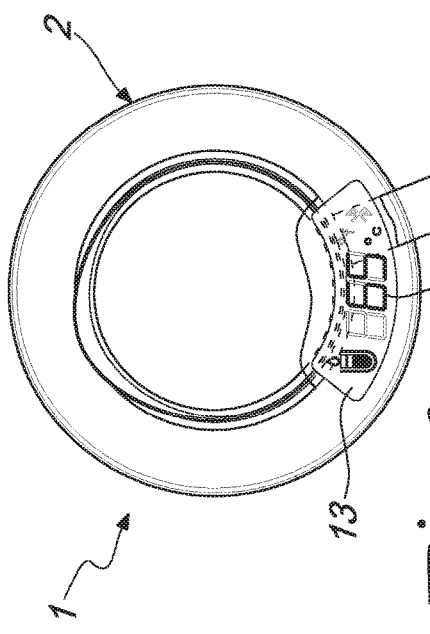
FIGS. 6 to 9 show the electric kettle of FIG. 1, in plan views from above, in four different configurations of use.
Figure 7:
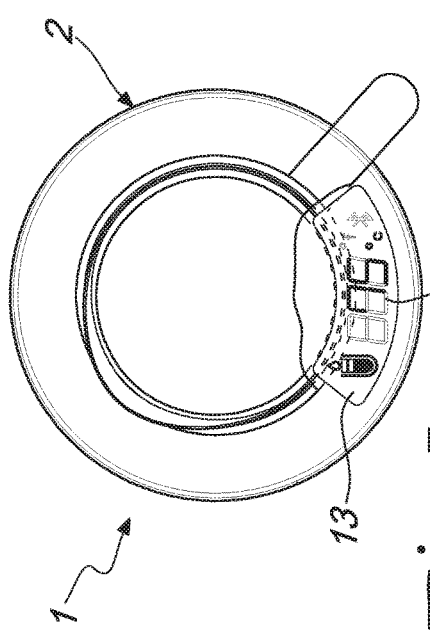
Figure 8:
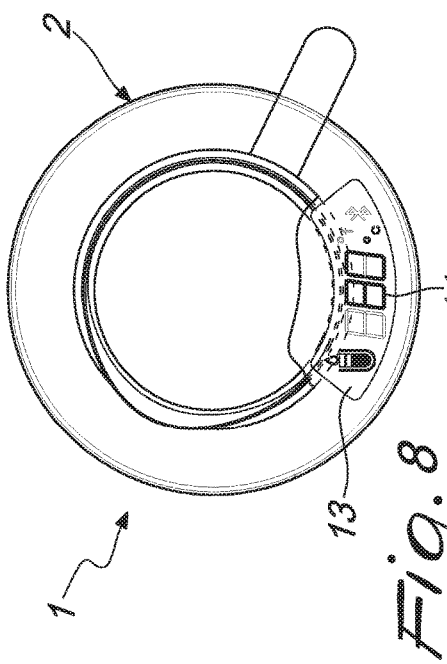
Figure 9:
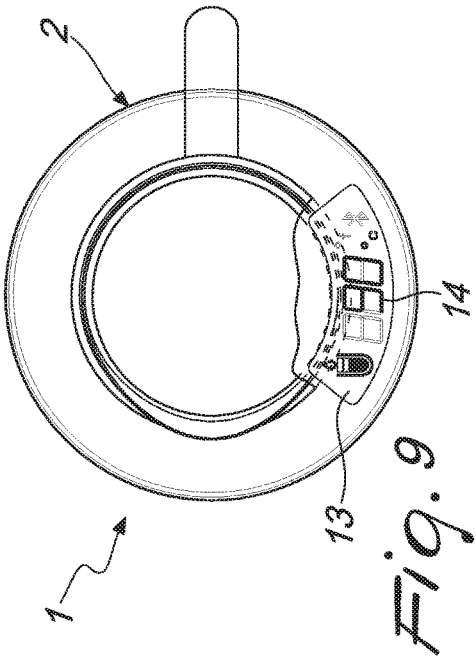

The method for heating water by way of the electric kettle 1 comprises the steps of:
providing the electric kettle 1,
taking the container body 2 from the base 4,
inserting in the container body 2 the quantity of water that it is desired to heat,
placing the container body 2 on the base 4,
rotating the container body 2 about its own longitudinal extension. axis 5 with respect to the base 4 in order to select the desired temperature to which to heat the water, as shown in FIGS. 6 to 9,
activating the electric heating means 3 by way of the proximity sensor 7 in order to heat the water to the desired temperature.

Placing the container body 2, containing water, on the base 4 determines, by default, setting the heating of the water to 100° C., :i.e. until it reaches boiling point.

Bringing the hand or a finger of the user close to the light signal 9, and therefore to the proximity sensor 7, determines the switching-on of the electric heating means 3 and therefore the heating of the water to boiling point.

Any rotation of the container body 2, placed on the base 4, by the user, entails the detection of a variation of the angular position of the container body 2 with respect to the base 4 and the consequent modification of the desired temperature to which to heat the water. Such desired temperature is shown on the display 13 and can be conveniently selected by rotating the container body 2, as if it were the water knob or lever of a mixer faucet.

In particular, rotation in one direction will entail the decrease of the desired temperature, for example from the default value of 100° C. to 80° C., while rotation in the opposite direction will determine the increase of the desired temperature, for example to be brought back to 100° C.

Once the desired temperature to which to heat the water is set, shown on the display 13, the user brings his/her hand or a finger close to the light signal 9, and therefore to the proximity sensor 7, thus determining the switching-on of the electric heating means 3 and therefore the heating of the water to the desired temperature.

Following the switching-on of the electric heating means 3 the display 13 no longer shows the desired temperature to which to heat the water but the actual temperature of the water, until it reaches the desired temperature.

The fact that the means 6 for detection of angular movement are adapted to also detect the speed of variation of the angular position of the container body 2 with respect to the base 4 makes it possible to distinguish whether the rotary motion is a brusque or accidental movement, owing for example to a settling of the positioning of the container body 2 on the base 4, or whether it is a movement made by the user in order to select the desired temperature to which to heat the water. In particular, above a certain threshold of speed of variation of the angular position of the container body 2, the rotation is classed as accidental and therefore it does not determine the adjustment of the desired temperature, while under such threshold the rotation of the container body 2 is classed as intentional by the user and associated with the variation of the desired temperature.

Advantageously the placing of the container body 2, containing water, on the base 4 also determines the initialization of the detection of the angular position of the container body 2 with respect to the base 4. In other words the reference position that entails the default heating of the water to boiling point is set in each instance as a function of the position assumed by the container body 2 with respect to the base 4 when the container body 2 is placed on the base 4.

FIGS. 6 to 9 show how it is possible to vary the desired temperature to which to heat the water simply by rotating the container body 2 a few degrees with respect to the base 4.

In practice it has been found that the electric kettle, according to the present invention, achieves the intended aim and objects in that it enables a use thereof which is intuitive, straightforward and natural.

Another advantage of the electric kettle, according to the invention, consists in that its use, and specifically the actions that the user has to perform to adjust the desired heating temperature, refer to the known actions that are carried out in order to adjust the temperature of the water exiting from a mixer faucet.

Another advantage of the electric kettle, according to the invention, consists in that it provides a user interface that is straightforward, enjoyable and interactive to use.

Another advantage of the electric kettle, according to the invention, consists in that it is substantially free from buttons.

Another advantage of the electric kettle, according to the invention, consists in that it can also be activated and used remotely, by way of the wireless communication module.

Yet another advantage of the electric kettle consists in that the water container element is physically separate from the external structure of the kettle, and in this way it tends to remain at ambient temperature and not be affected by the heating of the water container element. Furthermore in this way it is not necessary to provide a specific insulation for the walls of the kettle in order to prevent scalding of the user.

Another advantage also relates to the possibility of disassembling the main components of the kettle, in order to be able to clean them easily.

The electric kettle thus conceived is susceptible of numerous modifications and variations, all of which are within the scope of the appended claims.

Moreover, all the details may be substituted by other, technically equivalent elements.

In practice the materials employed, provided they are compatible with the specific use, and the contingent dimensions and shapes, may be any according to requirements.

The disclosures in Italian Patent Application No. 102015000027411 (UB2015A001629) from which this application claims priority are incorporated herein by reference.

What is claimed is:

1. A electric kettle comprising a container body comprising electric heating means adapted to heat water contained in said container body, and comprising a base, configured to support said container body and to supply electric power at least to said electric heating means when said container body is supported by said base, said container body comprising a longitudinal extension axis and being able to rotate about said longitudinal extension axis, with respect to said base, further comprising means for detecting the angular movement of said container body with respect to said base, the extent to said angular movement detected by said means for detecting angular movement determining the degree of activation of said electric heating means necessary in order to bring said water to a desired temperature.

2. The electric kettle according to claim 1, further comprising at least one proximity sensor, adapted to determine the activation or shutdown of said electric heating means.

3. The electric kettle according to claim 1, further comprising light projection means configured to generate a light signal proximate to said at least one proximity sensor and visible on the external surface of said electric kettle.

4. The electric kettle according to claim 1, wherein said means for detecting angular movement comprise an encoder selected from the group consisting of: optical encoders, potentiometric encoders, capacitive encoders, inductive encoders and magnetic encoders.

5. The electric kettle according to claim 1, further comprising means for detecting the quantity of water contained in said container body.

6. The electric kettle according to claim 1, further comprising a wireless communication module configured to remotely connect a mobile device and remotely control the operation of said electric kettle.

7. The electric kettle according to claim 1, wherein said means for detecting angular movement are configured to detect the direction of rotation of said container body with respect to said base, a rotation in one direction determining an increase of the value of said desired temperature, rotation in an opposite direction determining a decrease of the value of said desired temperature.

8. The electric kettle according to claim 6, further comprising a display adapted to display the actual temperature of the water, or the desired temperature of the water, or the quantity of water present in said container body, or the status of said wireless communication module.

9. The electric kettle according to claim 1, wherein said means for detecting angular movement comprise an optical encoder comprise a photodiode associated with said base and reading code applied to a lower face of said container body, which faces said base.

10. The electric kettle according to claim 1, wherein the container body comprises an external supporting structure adapted to support a container element associated with said external supporting structure so that walls of said container element are substantially separated from walls of said external supporting structure.

11. A method for heating water, comprising the steps of:
providing an electric kettle according to one or more of the preceding claim,
extracting said container body from said base,
introducing water into said container body,
placing said container body on said base,
rotating said container body about its own longitudinal extension axis with respect to said base in order to select the desired temperature of said water,
activating said electric heating means by way of said proximity sensor in order to heat said water to said desired temperature.

* * * * *